(No Model.)
C. E. DOUGHERTY.
PNEUMATIC HOLDER FOR MIRRORS AND OTHER ARTICLES.
No. 377,995. Patented Feb. 14, 1888.
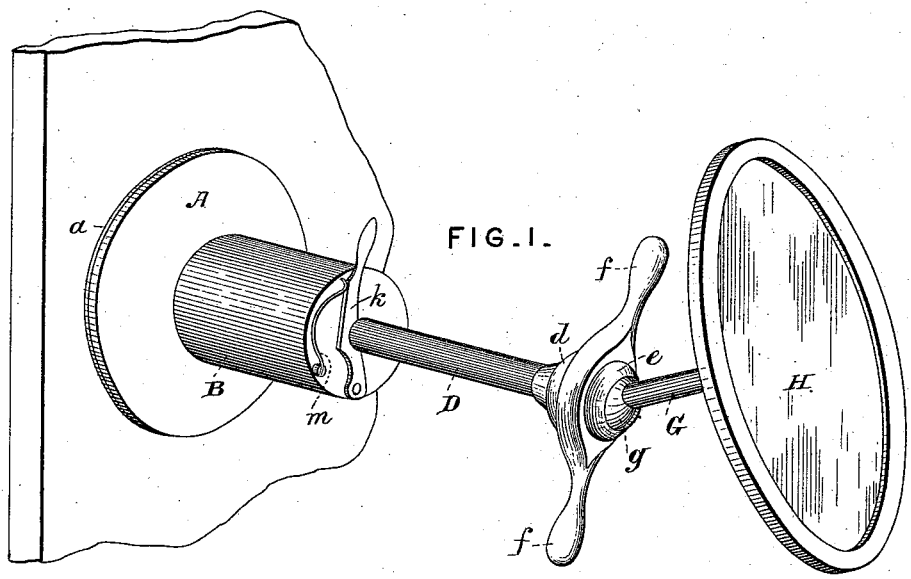
FIG. I.
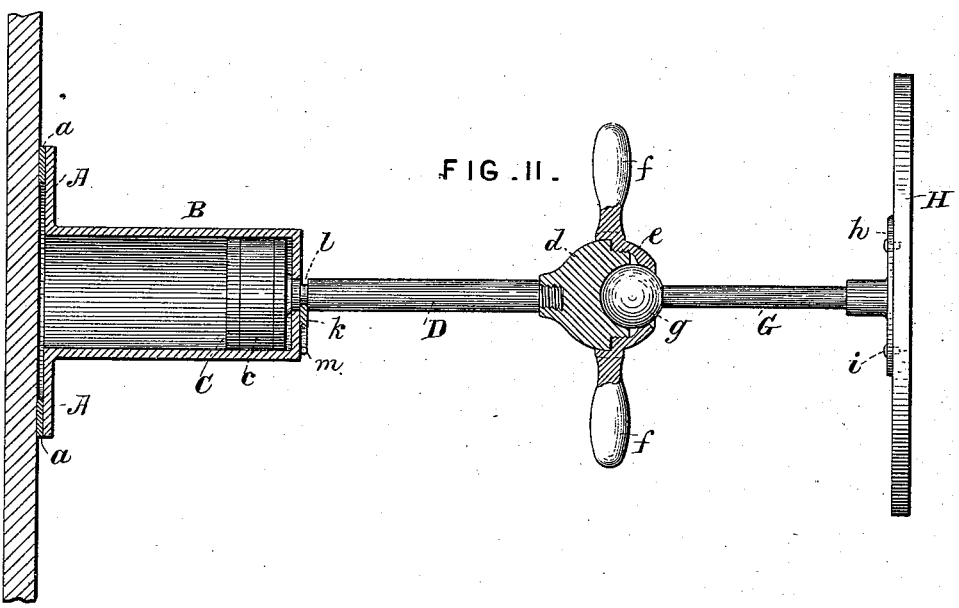
FIG. II.

UNITED STATES PATENT OFFICE.

CLARENCE E. DOUGHERTY, OF NEWARK, NEW JERSEY.

PNEUMATIC HOLDER FOR MIRRORS AND OTHER ARTICLES.

SPECIFICATION forming part of Letters Patent No. 377,995, dated February 14, 1888.

Application filed June 1, 1887. Serial No. 240,003. (No model.)

*To all whom it may concern:*

Be it known that I, CLARENCE E. DOUGHERTY, of Newark, in the county of Essex and State of New Jersey, have invented a new and useful Pneumatic Holder for Mirrors and other Articles, which is fully set forth in the following specification.

This invention relates to devices for holding or supporting a mirror or other article in such manner that it can be readily moved to different positions, while at the same time securely held in position.

The invention is particularly designed for use on shipboard, where it is difficult for travelers to hang a mirror or like article in a desired position to get the best light, though it may obviously be used under other circumstances and for other articles.

The holder or support consists of a base adapted to be attached to a wall or other smooth surface by pneumatic action—*i. e.*, by partial exhaustion of the air under it. This part of the device may conveniently consist of a plate having attached near the edge a strip or band of rubber or like material, the air being exhausted by a small plunger working in a cylinder on the back of the plate. The plunger-rod is adapted to carry the mirror or other article.

A bracket has heretofore been constructed having a rubber disk inclosed by a cup of metal, the edge of the disk being adapted for application to a wall or other smooth surface. A screw was provided whereby the center of the disk could be gradually drawn away from the wall, leaving the edges in contact therewith and forming a vacuum or partial vacuum, so that the device might be held against the wall by pressure. A bracket has also been devised similar to the foregoing, except that the rubber disk or diaphragm is drawn out by a sliding rod instead of by a screw. In a device so constructed, when the rubber disk is under tension, being drawn up at the center, there is naturally a tendency of the edges to contract toward the center and slip over the surface to which it is attached, and when this occurs air is of course admitted behind the disk. The use of a plunger and cylinder permits the air to be immediately exhausted from behind the plate, (which is rigid,) whereby the device is attached to the wall quickly and with great security.

In order that the mirror or other article may be turned in any desired direction, it is preferred to connect the standard of the holder with the piston-rod by a universal joint provided with means for fixing the standard in any desired position. The base and cylinder of the pneumatic holder are preferably made of hard vulcanized rubber; but obviously brass or other metal could be employed instead.

The accompanying drawings, which form part of this specification, show a holder or support constructed in accordance with the invention, Figure I being a perspective view, and Fig. II a vertical section.

The base of the device is a plate or disk, A, preferably of hard rubber. On its under side is a band, *a*, of rubber, extending entirely around the plate A near its edge. In the center of the plate A is a circular hole which communicates with a short cylinder, B, in which works a plunger or piston, C, provided with a packing-ring, *c*, of rubber, to insure a tight fit in the cylinder B. The piston-rod D extends out through the end of the cylinder, and at its upper end is provided with a hollow cup-shaped enlargement, *d*, which forms half of a hollow sphere. The outer surface of the enlargement *d* is provided with a screw-thread, upon which is engaged the internally-threaded part *e*, which forms the other half of the hollow sphere. The part *e* has handles *f*, which serve both to tighten it and also to draw out the piston C.

A rod, G, passes through a hole in the part *e*, and has at its end a ball, *g*, which closely fits the hollow sphere, forming a universal joint. On the other end of this rod any device may be attached which will hold the article desired to be utilized, as a hand-glass, candle, lamp, or other article.

The drawings show a plate, *h*, attached to the end of the rod, provided with holes for screws *i*, whereby a mirror, H, or other article may be fastened to the plate. These holding devices may, of course, be of any suitable construction.

On top of cylinder B is pivoted a catch, *k*, formed of a flat strip of metal, which is adapted to engage a groove, *l*, formed in rod D, when the plunger is drawn out as far as it will go, and thus prevent its being accidentally pushed in. The catch k is actuated by a spring, m.

In use the plate A is pressed firmly and evenly against any hard smooth surface, so that the rubber band a touches the surface at all points in its circumference. The plunger or piston is then drawn outward by the handles f, exhausting the air behind plate A, which is consequently held in place by the pressure of the outer air.

The rod G can be turned to any desired position, and held therein by turning handles f and clamping the ball g between the two parts d e of the socket.

It is obvious that the details of construction may be varied without departing from the spirit of the invention.

I claim—

1. In a holder or support for a mirror or other article, the combination of the base-plate having around the edge a strip of rubber or like material, a cylinder carried by said plate, a piston for exhausting air from behind said plate, a piston-rod, and holding devices attached to said rod, substantially as described.

2. The combination of the base, the cylinder and piston for exhausting air from behind the same, the piston-rod, the holding devices connected with said rod by a universal joint, and clamping devices, substantially as described.

3. The combination of the base-plate, cylinder, piston, piston-rod provided with a groove, and a spring-catch for engaging therewith, substantially as described.

In testimony whereof I have signed this specification in the presence of two subscribing witnesses.

CLARENCE E. DOUGHERTY.

Witnesses:
M. T. DWYER,
JOHN MCCLURE.